United States Patent [19]

Kawasaki et al.

[11] Patent Number: 5,032,158

[45] Date of Patent: Jul. 16, 1991

[54] METHOD OF MANUFACTURING THERMAL PRINTER HEAD

[75] Inventors: Sadanobu Kawasaki; Hideaki Kuno, both of Kanagawa, Japan; Donald W. Kuty, Niagara Falls, N.Y.

[73] Assignee: E. I. Du Pont de Nemours and Company, Wilmington, Del.

[21] Appl. No.: 609,142

[22] Filed: Oct. 31, 1990

Related U.S. Application Data

[63] Continuation of Ser. No. 317,898, Mar. 2, 1989, abandoned.

[30] Foreign Application Priority Data

Mar. 2, 1988 [JP] Japan .................................. 63-49437

[51] Int. Cl.[5] .................................... C03B 19/09

[52] U.S. Cl. .................................... 65/18.1; 156/89

[58] Field of Search ....................... 65/18.1, 18.3, 18.4; 264/58, 60, 62; 427/376.1; 156/89

[56] References Cited

U.S. PATENT DOCUMENTS

| | | | |
|---|---|---|---|
| 3,990,929 | 11/1976 | Evans | 156/230 |
| 4,035,613 | 7/1977 | Sagawa | 219/535 |
| 4,186,918 | 2/1980 | Ficker et al. | 271/98 |
| 4,221,047 | 9/1980 | Narken | 65/33 |
| 4,510,000 | 4/1985 | Kumar et al. | 156/230 |
| 4,523,121 | 6/1985 | Takahashi et al. | 310/328 |

FOREIGN PATENT DOCUMENTS

| | | | |
|---|---|---|---|
| 58-145644 | 8/1983 | Japan | 65/18.1 |
| 59-121152 | 7/1984 | Japan | 65/18.1 |
| 59-215367 | 12/1984 | Japan | . |
| 61-074865 | 4/1986 | Japan | . |
| 61-290068 | 12/1986 | Japan | . |
| 63-268279 | 11/1988 | Japan | . |

*Primary Examiner*—Richard V. Fisher

*Assistant Examiner*—John J. Bruckner

[57] ABSTRACT

A method of manufacturing a thermal printer head on a substrate having a heat accumulating layer on a surface thereof, a dot-like heat generating resistor group arranged in a straight line on said surface of said heat accumulating layer, and an electrode group for supplying power to said heat generating resistor group. The heat accumulating layer is formed by the sequential steps of:

(1) forming a slip, which contains, as major component, an inorganic powder material for constituting said heat accumulating layer and an organic binder into a green sheet;

(2) cutting the green sheet into the shape of heat accumulating layer;

(3) laminating the cut green sheet to a predetermined position of the substrate; and (4) firing the green sheet.

7 Claims, 2 Drawing Sheets

METHOD OF MANUFACTURING THERMAL PRINTER HEAD

This application is a continuation of application Ser. No. 07/317,898 filed Mar. 2, 1989, now abandoned.

BACKGROUND OF THE INVENTION

1. Field of the Invention

The invention relates to a method of manufacturing a thermal printer head and, more particularly, to a method of forming a heat accumulating layer supporting a heat generating member.

2. Description of the Related Art

Thermal recording systems have been widely used for many years despite the fact that they are not systems for normal paper printing. This wide and continued usage is due, in part, to the recording apparatuses of these systems being compact, easy to maintain, and comparatively inexpensive. A thermal head or a thermal printer head constitutes the major recording section of a thermal recording system. Improvements in the quality of the thermal head or thermal printer have also contributed to the popularity of thermal recording systems. More specifically, in a conventional thermal recording system, characters and images of low image quality are mainly recorded. In contrast to this, with the improvement in resolution, heat response, temperature uniformity and the like of the thermal head, an image of a higher image quality can be obtained at a resolution of 8 dots/mm or higher and at a higher speed. Also, along with the development in the thermal recording method, an image having a quality close to that of a color photograph can be reproduced from an electric image signal obtained from a television receiver, a video set, an electronic camera, and the like.

Generally, methods of manufacturing a thermal head are divided between a thin film method and a thick film method. Although both of them have advantages and disadvantages, the thick film method is generally regarded to be easy since: (1) facility cost is small; (2) productivity is high; (3) it enables manufacture of a large substrate; (4) its patterning process is simple; and (5) materials are used effectively without loss.

As described, for example, in Japanese Patent Application (OPI) Nos. 61-290068 and 61-74865, a general method to form a heat assimilating layer of a thermal printer head in accordance with the thick film method is as follows:

(1) An inorganic powder material which will constitute the heat accumulating layer is formed into a paste; (2) the paste is printed on a substrate a plurality of times using a screen mask having a predetermined pattern; and (3) the resultant substrate is fired at a predetermined temperature.

However, apart from the characteristics required of the material, various drawbacks are posed by screen printing which is seemingly simple.

The heat accumulating layer must have the following characteristics:

(1) When thermal printing is performed, the respective heat generating members must be in contact with the surface of a recording sheet at a uniform pressure. Therefore, the surface of the heat accumulating layer must be quite flat and smooth.

(2) The heat accumulating layer must have sufficient heat resistance and durability to withstand instantaneous temperature increases and decreases during thermal printing. In addition, the heat accumulating layer must have a uniform heat accumulating performance and heat conduction performance. Therefore, no structural defect such as a void or crack may be present in the heat accumulating layer, and the heat accumulating layer must have a uniform, dense structure completely free from surface pinholes.

Regarding these respects, when screen printing is used, screen mesh lines tend to remain because of the printing mechanism. Since a paste is printed through the fine openings of the screen mesh, the paste inevitably tends to form bubbles and generate pinholes. Therefore, the screen printing method is not the most suitable process for forming a heat accumulating layer. In practice, in order to overcome defects such as surface pinholes and to provide a layer having a predetermined thickness, printing and firing are repeated about 2 to 5 times with a paste having a low viscosity, thus resulting in a cumbersome process.

SUMMARY OF THE INVENTION

It is an object of the invention to provide an improved method for forming a heat accumulating layer of a thick film thermal printer head which does not suffer from the foregoing drawbacks associated with the conventional method.

After intensive studies, we have found that the above drawbacks in forming a heat accumulating layer on a substrate are eliminated if the screen printing method is not adopted but, instead, a green sheet obtained by coating or casting is cut to have an appropriate size, laminated on the substrate and fired.

Therefore, according to the invention, there is provided a method of manufacturing a thermal printer head comprising a substrate having a heat accumulating layer on a surface thereof, a dot-like heat generating resistor group arranged in a straight line on the surface of the heat accumulating layer and an electrode group for supplying power to the heat generating resistor group, characterized in that a method of forming the heat accumulating layer comprises the sequential steps of:

(1) forming a slip which contains as major components an inorganic powder material for constituting the heat accumulating layer and an organic binder into a green sheet;

(2) cutting the green sheet into the shape of heat accumulating layer;

(3) laminating said cut green sheet to a predetermined position of the substrate; and (4) firing the green sheet.

Production of a heat accumulating layer is considerably improved by the invention. Further, before or after the step of processing the green sheet into a predetermined size and shape, the green sheet may be tested, as required, to remove a defective portion thereof, thus extremely improving yield.

DETAILED DESCRIPTION OF THE INVENTION

As the inorganic powder material constituting the heat accumulating layer, an appropriate glass composition containing a material selected from the group consisting of alumina, silica, boron oxide, lead oxide, and so on may be used. Various additives may be added in order to effect the thermal characteristics of the glass composition, e.g., glass transition point, softening point, melting point, crystallization startpoint and crystal melting point, as well as melting viscosity and various other characteristics to be described later. Typical examples of such additives are titanium oxide, zinc oxide, barium oxide, potassium oxide, sodium oxide, calcium oxide, zirconium oxide, cadmium oxide, copper oxide, magnesium oxide, manganese oxide, bismuth oxide, and so on. However, the additives are not limited to these and include any material which does not depart from the gist of the invention. Powders of inorganic compositions obtained from selected members of the materials or their combinations can be mixed and used as the inorganic materials.

When the material of the heat accumulating layer is to be actually used in a thermal printer head, the following conditions must be satisfied:

(1) the heat accumulating layer must have sufficient adhesion to the substrate;

(2) the heat accumulating layer must have sufficient adhesion to the various layers which may be deposited or sputtered thereto later in the process and must be chemically inert to these later applied layers;

(3) the thermal expansion coefficient of the heat accumulating layer must substantially match that of the substrate;

(4) the heat accumulating layer must have a heat resistance and durability sufficient to withstand the instantaneous temperature increases and decreases of the heat generating resistors; and (5) the various features described above must not be impaired by environmental conditions.

Particularly, when item (4) is considered, crystalline glass is preferred as the glass composition.

A glass composition is usually powdered by melting and quenching. The glass powder may then be divided by milling such as ball milling, to obtain a glass powder having an appropriate particle size. At this stage, the glass is mostly amorphous since quenching has been performed. The softening point in the amorphous state is lower than the crystal melting point. Thus, when such a glass powder is used in the heat accumulating layer, the softening point of the amorphous state must be 500° C. or higher, preferably 600° C. or higher, so that excessive glass flow during firing is prevented, the thickness of the layer is appropriately maintained and the shape of the layer is not compromised. At the same time, it is preferable that the crystallization or nucleation start-point is not considerably higher than the softening point of the amorphous state, that is, the difference between these two points must be ±100° C. or less and preferably ±50° C. or less, so that the shape of the heat accumulating layer can be easily controlled. Normally, crystallization starts based on thermodynamic equilibrium and occurs relatively slowly. Therefore, even if the temperature has become higher than the crystallization startpoint during firing, the glass composition is crystallized abruptly.

The crystal melting point must be slightly lower than the peak temperature of firing, and preferably is lower than that by 5° C. or more. In this case, the crystalline phase of the glass composition is completely melted at the peak temperature of the firing irrespective of its size, and the entire glass composition is uniformly crystallized during the temperature drop that follows the peak temperature of the firing. The actual heat resistance of the heat accumulating layer depends upon the crystal melting point. Therefore, the higher the crystal melting point, the better. If firing is performed at a temperature of 900° C., a glass composition having a crystal melting point slightly lower than that is preferably used.

When an inorganic powder material is to be formed into a slip, it is usually mixed with an organic binder, a plasticizer, a solvent and other additives and made into a slip. An organic polymer is preferable as the organic binder.

Examples of the organic polymer binder are vinyl polymers such as poly(vinyl butyral), poly(vinyl acetate), and poly(vinyl alcohol), cellulosic polymers such as methyl cellulose, ethyl cellulose, hydroxyethyl cellulose, and methylhydroxyethyl cellulose, atactic polypropylene, polyethylene, silicone polymers such as poly(methyl siloxane) and poly(methylphenyl siloxane), and other various polymers such as polystyrene, a copolymer of butadiene/styrene, poly(vinyl pyrrolidone), polyamide, high molecular weight polyether, a copolymer of ethylene oxide/propylene oxide, and polyacrylamide. Acrylic polymers such as sodium polyacrylate, poly(alkyl acrylate), poly(alkyl methacrylate), a copolymer of alkyl acrylate/alkyl methacrylate, a copolymer of ethyl methacrylate/methyl acrylate, a terpolymer of ethyl acrylate/methyl methacrylate/methacrylic acid can also be used.

A monomer, oligomer or low molecular weight polymer of the above polymers can be added in order to improve the nature of the polymer as the organic polymer binder.

As the plasticizer, diethyl phthalate, dibutyl phthalate, butyl benzyl phthalate, dibenzyl phthalate, alkyl phosphate, poly(alkylene glycol), poly(ethylene oxide), hydroxy ethylated alkylphenol, tricresyl phosphate, triethylene glycol diacetate, or a polyester plasticizer, or a combination of two or more of these materials may be used in accordance with the polymer to be used.

As the solvent, acetone, xylene, methanol, ethanol, isopropanol, methyl ethyl ketone, 1,1,1-trichloroethane, tetrachloroethylene, amyl acetate, 2,2,4-triethyl pentadiole-1,3-monoisobutyrate, toluene, methylene chloride, or a fluorocarbon solvent, or combination of one or more of these materials may be used in accordance with the polymer used.

As for the other additives, dispersants, antiaggregation agents, wetting agents, releasants, anti-foaming agents, levelling promoters, anti-pinhole agents, etc., or a combination of two or more such additives may be used. The composition of the slip is not limited to the materials described above.

A normal milling method such as ball milling, sand milling, bead milling, and oscillating milling can be used for mixing the slip. An inorganic powder having an average particle diameter in the range of about 1 to about 10 μm is generally used. But, the average particle diameter is not limited to this range. When the particle diameter is too large, it is difficult to increase the density of the heat accumulating layer after firing, resulting in poor surface smoothness. On the other hand, when the particle diameter is excessively small, the viscosity of the slip is so high that preparation of the slip is difficult and the amount of the organic polymer binder must be increased, thereby resulting in poor firing or low density after firing. Hence, the average diameter must be appropriately selected.

As the coating method of the slip, a conventional method such as flood coating, air-knife coating, blade coating, extrusion coating or roll coating may be selected in accordance with the viscosity of the slip or the coating thickness.

As the coating base film, a polyester film or a polypropylene film can be used in accordance with size stability and heat resistance upon drying. However, other films can also be used. If a base film, such as a polyester film, which has an adhesion strength exceeding a predetermined level with respect to a green sheet is used, a silicone-based releasant or the like is preferably coated on the surface of the base film so that removal of the base film is facilitated.

Coating need not be performed on the base film. For example, coating can be performed on a metal endless belt. After the coating is dried, the coated layer may be removed from the endless belt, thus forming only a green sheet. However, when the subsequent steps such as testing, working, and so on are considered, it is practical to support the green sheet by the base film. Therefore, the following description is based on this assumption.

When the green sheet is tested as required, either before or after the step of cutting and only the good green sheet is selected, a defective green sheet can be removed, thus increasing the yield.

The green sheet is cut into the shape of a heat accumulating layer, then the cut green sheet is laminated onto a substrate. In the lamination, the green sheet can be pressed appropriately and, if required, heated to an appropriate temperature.

A green sheet which is cut into an elongated slip is adhered on a substrate together with the base film by conventional pressing. Temperature, pressure, time, press die, and so on are known important factors of pressing.

The press temperature is set to be higher than room temperature so that the organic component in the green sheet is sufficiently softened, the green is sheet is easily adhered to the substrate, and the green density is increased to a certain degree by pressing. The press temperature is preferably 60° to 100° C. and more preferably 70° to 90° C. Therefore, the ratio of the inorganic and organic components, such as organic polymer binder and plasticizer, of the green sheet must be set such that the green sheet does not have excessive adhesion at room temperature but has adequate adhesion at 70° to 90° C.

The pressing pressure and pressing time may be determined by considering the mass being pressed together with the required adhesion. When the bending resistance of the substrate is also considered, a pressure of 50 $kg/cm^2$ or less is preferable. However, a higher pressure can be adopted if a cushion member or the like is used. Simultaneously, the heat accumulating layer is preferably substantially semicylindrical. Therefore, when a press die having a substantially semicylindrical shape is selected and pressing is performed with it, the shape of the heat accumulating layer after firing can be controlled to a certain degree.

As for firing, a furnace normally used in the production of hybrid integrated circuit can be used. Generally, the green sheet is fired at a temperature of about 800° to 930° C. and for about 5 to 20 minutes under appropriate gas supply/exhaust conditions. In the invention, the above described thermal characteristics of the inorganic powder material and the firing temperature conditions together effect the performance of the accumulation layer. Therefore, it is preferable that the firing conditions are coordinated with the inorganic powder material used.

According to the invention, a thermal printer head having stable quality and durability is formed with high yield.

Compared with the thermal printer head manufactured by the conventional manufacturing methods, the thermal printer head manufactured in accordance with the method of the invention has various advantages as follows:

(1) voids or holes in and on the heat accumulating layer are quite few, thus, the uniformity of the thermal conductivity of the heat accumulating layer can be easily realized;

(2) the surface of the heat accumulating layer has excellent smoothness and flatness, thus, the uniformities of the film thickness of the heat generating resistor layer and the heat generating charcteristics can be easily realized;

(3) the force to press the recording sheet is uniform, thus, the recording image quality is improved;

(4) multilayer printing by screen printing need not be performed for formation of the heat accumulation layer, thus, the entire process is considerably simplified; and (5) the above described effects together provide a considerable improvement in the yield.

EXAMPLE

Figure 1A:
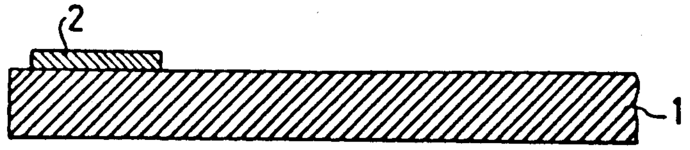
FIGS. 1(*a*) to 1(*f*) show sectional views of a thermal printer head which sequentially correspond to the steps of one embodiment of the present invention.
Figure 1B:
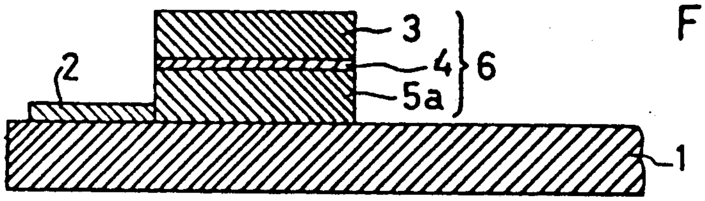
Figure 1C:
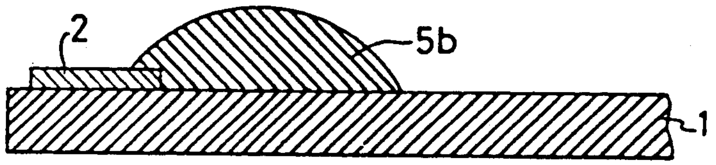
Figure 1D:
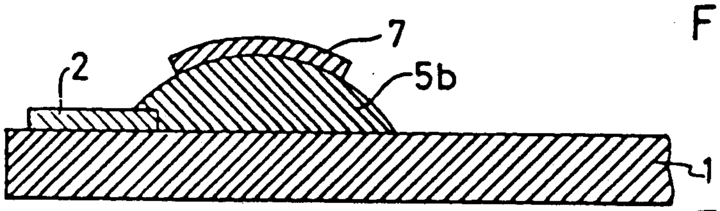
Figure 1E:
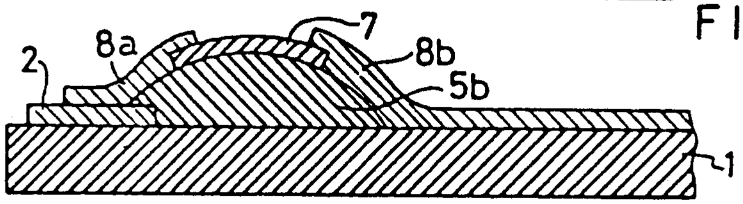
Figure 1F:
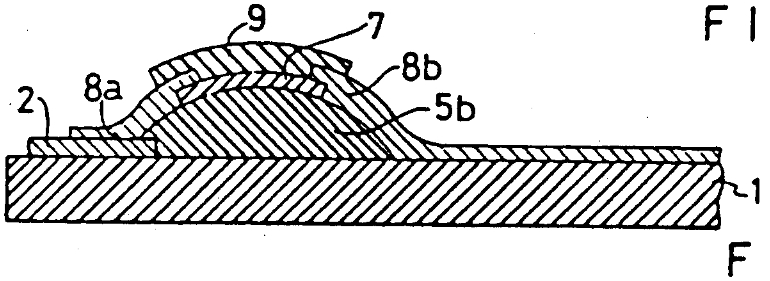

In the following example, the invention will be described in more detail with reference to the accompanying drawings. Note that the invention is not limited to this embodiment.

Step A: On alumina substrate 1 containing about 96% of alumina. a conductive paste containing Au as a major component was printed by screen printing as shown in FIG. 1(*a*). Substrate 1 was fired at 850° C. for 10 minutes, thus forming the conductive paste into common electrode 2 having a film thickness of about 5 μm.

Step B: A glass composition containing 30 wt. % of lead oxide, 35 wt. % of silica, 10 wt. % of barium oxide and having a thermal expansion coefficient of 6.2 ppm/°C, a glass transition point of 605° C., a softening point of 665° C., a nucleation starpoint of 640° to 680° C., and a crystallization point of 860° to 900° C. was finely divided, dispersed in a solution of an acrylic polymer, and formed into a slip.

Step C: Silicone releasant 4 was coated on one surface of polyester film 3 having a thickness of 100 μm, thus providing a base film. The slip obtained by step B was coated on the treated surface of the base film by blade coating, and dried, thus providing green sheet 5*a* of a thickness of about 100 μm supported by the polyester film.

Figure 3:
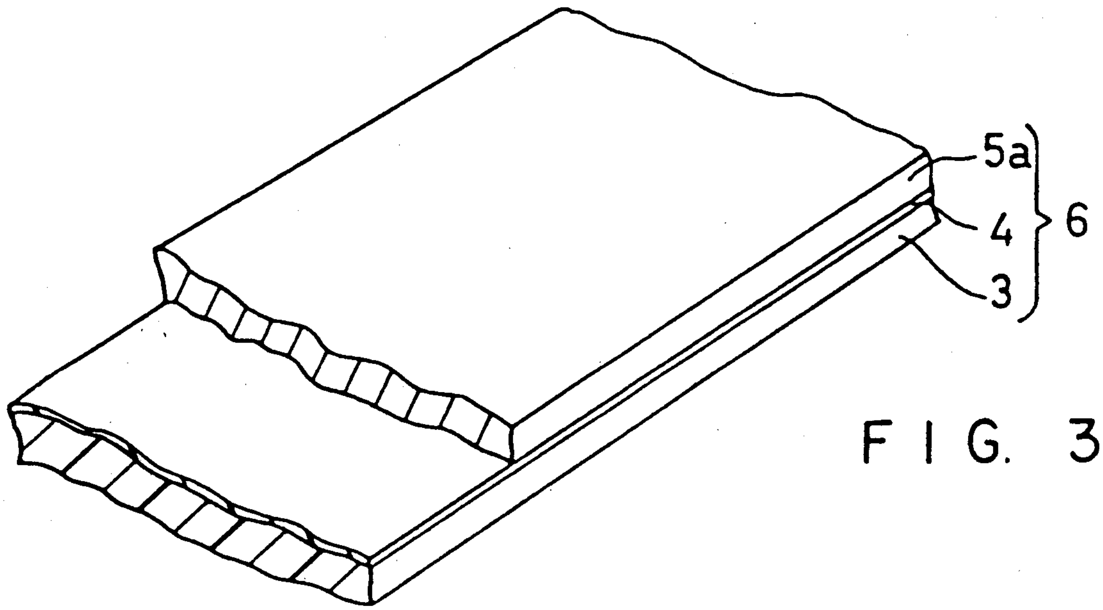
FIG. 3 shows green sheet 5*a* formed by the embodiment of the invention in FIGS. 1(*a*) to 1(*f*).

Step D: A defective portion of green sheet 5*a* obtained by step C was checked by microscopic observation using reflected and transmitted light. Green sheet 5*a* was cut to have a width of about 1.0 mm together with polyester base film 3 by a ceramic cutting machine, thus obtaining thin, elongated laminated assembly 6 having a length of about 20 cm consisting of the green sheet 5*a*, the silicon releasant 4 and the polyester base film 3, as shown in FIG. 3.

Step E: Laminate assembly 6 was placed at a predetermined position on the substrate 1 in slight tension with the electrodes obtained by step A so that a surface of the green sheet was in contact with the substrate as shown in FIG. 1(*b*). A pressure of about 5 $kg/cm^2$ was applied to the substrate and laminated assembly 6 at a temperature of about 80° C. for about 10 minutes, thereby adhering the substrate and laminated assembly 6 to each other.

Step F: Polyester film 3 was carefully removed from the upper surface of the green sheet. The green sheet 5*a* was fired under a temperature profile having a peak temperature of 900° C. lasting for 10 minutes. As a result, heat accumulating layer 5*b* having a smooth surface was formed on the substrate as shown in FIG. 1(*c*).

Step G: A tantalum nitride layer having a thickness of about 0.1 $\mu$m was formed at a predetermined position on the surface of heat accumulating layer 5*b* by sputtering. The resultant structure was etched using a photoresist, thus forming patterned heat generating resistor thin film 7 as shown in FIG. 1(*d*).

Step H: A nichrome layer having a thickness of about 0.05 $\mu$m and thereafter a gold layer having a thickness of about 1.0 $\mu$m were formed on the above structure by vacuum deposition. Etching was performed using a photoresist, thereby forming patterned individual electrode layers 8*a* and 8*b* respectively, as shown in FIG. 1(*e*).

Figure 2:
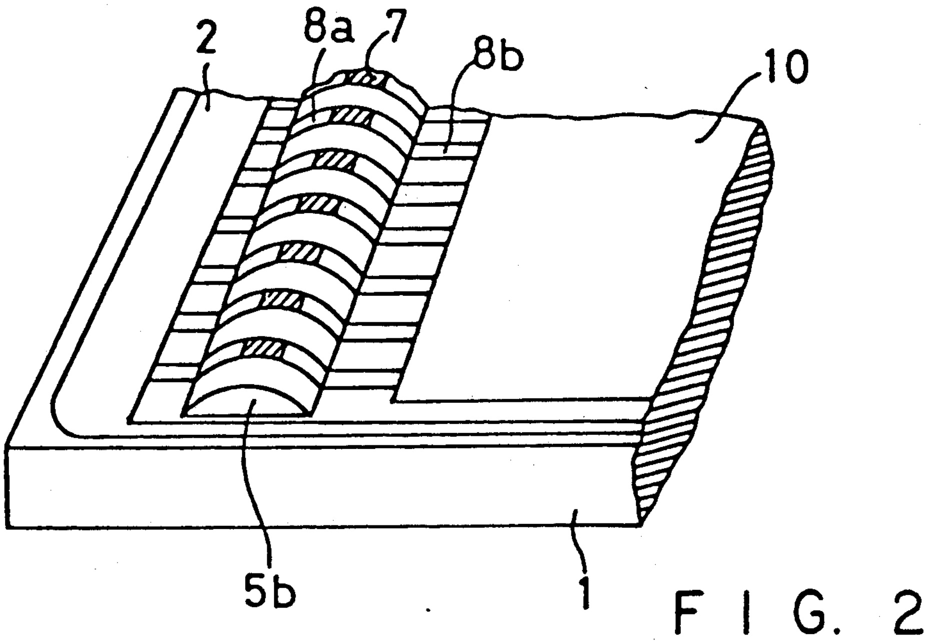
FIG. 2 is a schematic view of the thermal printer head formed by the embodiment of the invention in FIGS. 1(*a*) to 1(*f*).

Step I: A silicon oxide layer having a thickness of about 2 $\mu$m and a tantalum pentoxide layer having a thickness of about 5 $\mu$m were formed by sputtering in order to protect heat generating resistor layer 7, thus forming protecting layer 9. FIG. 2 is a schematic view of the resultant thermal printer head from which protecting layer 9 is omitted in order to clearly show the internal structure. This figure also shows driving-circuit area 10.

A thermal printer head having a resolution of 8 dots/mm was obtained through the above steps.

What is claimed is:

1. In a method of manufacturing a thermal printer head comprising a substrate having a semi-cylindrical prism-shaped heat dissipative layer on a surface thereof, a dot-like heat generating resistor group arranged in a straight line on said surface of said heat dissipative layer, and an electrode group for supplying power to said heat generating resistor group, the improvement wherein the method of forming said semi-cylindrical prism-shaped heat dissipative layer comprises the sequential steps of:

(1) forming a slip, which contains, as major component, an inorganic powder material which forms said semicylindrical prism-shaped heat dissipative layer and which also contains an organic binder into a green sheet;

(2) cutting said green sheet into a shape that forms said semi-cylindrical prism-shaped heat dissipative layer;

(3) laminating said cut green sheet to a predetermined position on said substrate; and (4) firing the green sheet such that the crystalline phase in the inorganic powder is completely melted at the peak temperature of the firing regardless of its size and the entire inorganic powder composition is uniformly crystallized during the temperature drop that follows the peak temperature of the firing, the peak firing temperature being in the range of 800°–930° C. and at least 5° C. greater than the melting temperature of the crystalline phase of the inorganic powder composition in the green sheet.

2. The method of claim 1 in which the inorganic powder material is selected from the group consisting of alumina, silica, boron oxide, lead oxide and mixtures thereof.

3. The method of claim 1 in which the organic binder is an organic polymer.

4. The method of claim 1 in which the organic binder is an acrylic polymer and the inorganic powder material contains lead oxide, silica and barium oxide.

5. The method of claim 1 in which the slip further contains a solvent.

6. The method of claim 5 in which the slip is formed into a green sheet by the process comprising the sequential steps of:

coating a layer of the slip onto a base; and drying the coated layer of slip to remove the solvent therefrom.

7. The method of claim 1 in which the cut green sheet on the substrate in step (3) is in slight tension with an electrode on the substrate.

* * * * *